United States Patent [19]

Arika et al.

[11] Patent Number: 4,687,653

[45] Date of Patent: * Aug. 18, 1987

[54] PROCESS FOR PREPARATION OF ZEOLITE OE HAVING AN OFFRETITE TYPE STRUCTURE

[75] Inventors: Junji Arika, Tokuyama; Kazushige Igawa; Keiji Itabashi, both of Shinnanyo, all of Japan

[73] Assignee: Toyo Soda Manufacturing Co., Ltd., Shinnanyo, Japan

[*] Notice: The portion of the term of this patent subsequent to Jul. 23, 2002 has been disclaimed.

[21] Appl. No.: 795,863

[22] Filed: Nov. 7, 1985

Related U.S. Application Data

[62] Division of Ser. No. 539,734, Oct. 6, 1983, abandoned.

[30] Foreign Application Priority Data

Oct. 8, 1982 [JP] Japan ............................. 57-176078
Oct. 18, 1982 [JP] Japan ............................. 57-181409

[51] Int. Cl.$^4$ ............................................. C01B 33/28
[52] U.S. Cl. .................................. 423/329; 423/328; 423/330; 502/60; 502/77
[58] Field of Search .......................... 423/328–330, 423/118, 328 C; 502/60, 77

[56] References Cited

U.S. PATENT DOCUMENTS

| 2,950,952 | 8/1960 | Breck et al. | 423/328 |
| 3,578,398 | 5/1971 | Jenkins | 423/328 |
| 3,767,771 | 10/1973 | Guth et al. | 423/329 |
| 4,086,186 | 4/1978 | Rubin et al. | 423/329 |
| 4,093,699 | 6/1978 | Sand | 423/328 |
| 4,530,824 | 7/1985 | Arika et al. | 423/328 |
| 4,562,055 | 12/1985 | Arika et al. | 423/329 |

FOREIGN PATENT DOCUMENTS

| 2369997 | 11/1977 | France |  |
| 78058499 | 4/1983 | Japan |  |
| 1119962 | 7/1968 | United Kingdom | 423/329 |
| 1188043 | 4/1970 | United Kingdom | 423/329 |

OTHER PUBLICATIONS

Whyte et al, "Journal of Catalysts", 20, 1971, pp. 88–96.
Nature, vol. 214, 3rd Jun. 1967, pp. 1005–1006, London, GB, J. M. Bennett et al.: "The Solid State. Non-Identity of the Zeolites Erionite and Offretite".
Chemical Abstracts, vol. 92, No. 8, 25th Feb. 1980, p. 140, No. 61169h, Columbus, Ohio, US & PL-A-100 926 (Uniwersytet Jagiellonski) 31-03-1979.

Primary Examiner—John Doll
Assistant Examiner—Jackson Leeds
Attorney, Agent, or Firm—Cushman, Darby & Cushman

[57] ABSTRACT

Disclosed is a zeolite having a composition of the following formula: $xM_{2/n}O \cdot Al_2O_3 \cdot (5-10)SiO_2 \cdot yH_2O$ wherein M is at least one cation having a valency of n, and x is 0.8–2 and y is 0–10, and exhibiting an X-ray powder diffraction pattern shown in Table 1. This zeolite is prepared by a process wherein a reaction mixture comprising a silica source, an alumina source, an alkali source, a potassium source and water and having a composition satisfying the following molar ratios: $SiO_2/Al_2O_3=6-40$, $OH/SiO_2=0.3-1$, $K_2O/M_2O=0.1-0.9$ (M: the total of alkali metals), and $H_2O/SiO_2=10-70$, is crystallized at 120° to 200° C. with stirring. The zeolite is also prepared by a process wherein a granular amorphous aluminosilicate containing aluminum in an amount of 4 to 22 wt. % as $Al_2O_3$ (on the anhydrous base), which is obtained by reacting an aqueous alkali metal silicate solution with an aqueous aluminum-containing solution, is incorporated in an aqueous alkali metal hydroxide solution and/or an aqueous alkali metal silicate solution, to form a mixture having a composition defined by the above-mentioned molar ratios, and the mixture is crystallized with stirring.

6 Claims, 2 Drawing Figures

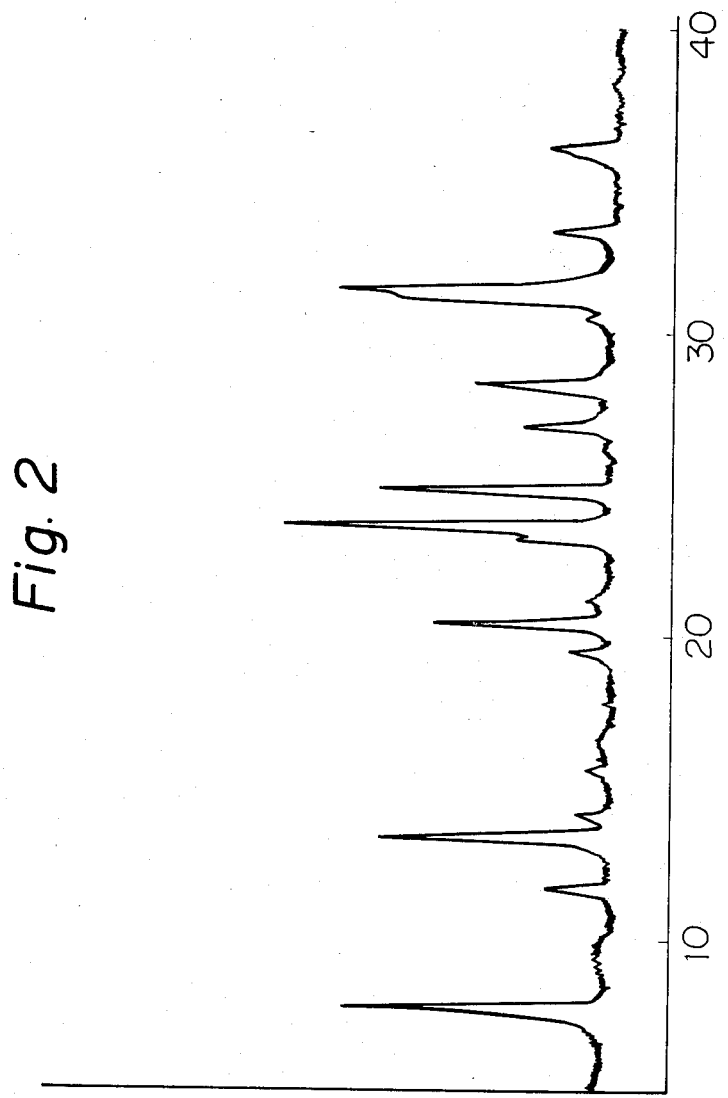

PROCESS FOR PREPARATION OF ZEOLITE OE HAVING AN OFFRETITE TYPE STRUCTURE

This is a division of application Ser. No. 539,734, filed Oct. 6, 1983, now abandoned.

BACKGROND OF THE INVENTION (1) Field of the Invention

This invention relates to a novel zeolite and a process for the preparation thereof. More particularly, it relates to a novel zeolite which has an offretite crystal structure as the basic structure but is different from known offretite zeolites in the microstructure and adsorbing characteristics, and a process for the preparation of this novel zeolite.

(2) Description of the Prior Art

Zeolite is a crystalline aluminosilicate containing zeolitic water, as is seen from the fact that the origin of zeolite is a Greek word "Zein" (boiling stone).

Ordinarily, the composition of zeolite is represented by the following general formula:

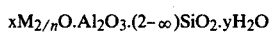

$$xM_{2/n}O.Al_2O_3.(2-\infty)SiO_2.yH_2O$$

wherein M stands for a cation having a valency of n and x and y are numbers larger than 0.

The basic structure of zeolite comprises $SiO_4$ tetrahedrons having the silicon atom at the center and four oxygen atoms at apexes and $AlO_4$ tetrahedrons having the aluminum atom instead of silicon at the center, in which the tetrahedrons are regularly three-dimensionally arranged, while owning oxygen atoms jointly, so that the O/(Al+Si) atomic ratio is 2. Accordingly, various network structures having fine pores differing in size and shape are formed according to the arrangement of the tetrahedrons. Negative charges of the $AlO_4$ tetrahedrons are electrically neutralized by coupling with cations such as alkali metal or alkaline earth metal cations.

The thus-formed fine pores have a size of 3 to ten-odd angstroms, but the size of the fine pores can be varied by exchanging the metal cations bonded to the $AlO_4$ tetrahedrons with other metal cations.

Zeolites are broadly used on an industrial scale as desiccants for gases or liquids and as molecular sieves for adsorbing specific components by utilizing the property of trapping specific molecules in these fine pores. Furthermore, products obtained by exchanging metal cations with hydrogen ions are used as catalysts for various industrial uses because the products act as solid acids.

Offretite, one type of zeolite, naturally occurs and the crystal structure belongs to the hexagonal system (lattice constants: a=13.29 angstroms, c=7.58 angstroms), and it has fine pores of 12-membered rings having a diameter of 6.4 angstroms, which are capable of adsorbing cyclohexane. Since offretite can be synthesized in the presence of tetramethylammonium ions (hereinafter referred to as "TMA ions"), synthetic offretite is generally called "TMA-offretite". TMA ions are built in the crystal of offretite and the chemical composition is expressed as follows:

$$x[(TMA)_2,K_2,Na_2]O.Al_2O_3.(5-10)SiO_2.yH_2O$$

wherein x and y are numbers larger than 0.

When this zeolite is calcined in air at 500° to 600° C., TMA ions are decomposed and isolated to form H ions, which is left in the offretite structure.

As a zeolite having a structure similar to that of offretite, erionite can be mentioned.

In the crystal of offretite, $\epsilon$-cages (cancrinite cages) are piled in one direction along the axis C with double six-membered rings interposed therebetween to form fine pores of 12-membered rings having a diameter of 6.4 angstroms.

In the crystal of erionite, $\epsilon$-cages are rotated by 60° from one another and piled in this state along the axis C with double six-membered rings interposed therebetween, and therefore, in addition to 12-membered rings having a diameter of 6.4 angstroms, there are formed 8-membered rings having a size of 3.6×5.2 angstroms in the coaxial direction (lattice constants: a=13.26 angstroms, c=15.12 angstroms). This slight difference of the crystal structure results in the following difference in the X-ray powder diffraction diagram. That is, in case of offretite, peaks at $2\theta=9.6°$, 16.6°, 21.4° and 31.9° (as measured by CuKα doublet) called "odd 1 line" are not present, while in case of erionite, these peaks are sharply observed. Accordingly, offretite can be clearly distinguished from erionite by the X-ray powder diffractometry.

Furthermore, offretite can adsorb cyclohexane, whereas erionite cannot adsorb cyclohexane, and thus, the zeolites are different in the adsorption properties.

It is known that in certain zeolites, these two crystal phases are concurrently contained in a crystal particle. As one of such zeolites, there can be mentioned zeolite T, and it is reported that these two crystal phases internally grow irregularly (see J. M. Bennett and J. A. Gard, Nature, 214, p. 1005, 1967). In the X-ray powder diffraction diagram of this zeolite, only two "odd 1 lines" are obserbed at $2\theta=9.6°$ and 21.4°, and with reference to the adsorption properties, the zeolite is characterized in that cyclohexane is not adsorbed at all (see D. W. Breck, Zeolite Molecular Sieves, p. 621, 1974).

In the X-ray powder diffraction diagram of a zeolite called "ZSM-34", disclosed in Japanese Unexamined Patent Publication No. 53-58499 filed by Mobil Oil Co., broad peaks are observed as "odd 1 line" at $2\theta=9.6°$, 16.6°, 21.4° and 31.9°. Accordingly, it is said that this zeolite comprises very small erionite regions internally growing in the offretite structure. This zeolite is capable of adsorbing n-hexane and cyclohexane, and it is said that the zeolite is very effective for various catalytic reactions.

Choline, which is an organic nitrogen-containing compound, or its derivatives should inevitably be used for the synthesis of this zeolite, and this organic nitrogen-containing cation is included as a part of the cation in the crystal structure of formed ZSM-34. Accordingly, the adsorptive activity or catalytic activity is not manifested unless this zeolite is calcined at 500° to 600° C. to decompose and remove the organic nitrogen-containing cation.

SUMMARY OF THE INVENTION

A primary object of the present invention is to provide a novel zeolite having an offretite type crystal structure as the main structure but being quite different from the conventional offretite type zeolites in the microstructure and adsorption properties.

Another object of the present invention is to provide a process whereby the above-mentioned novel zeolite can be prepared advantageously without using a TMA ion or an expensive organic nitrogen-containing compound such as choline.

The novel zeolite of the present invention (hereinafter referred to as "zeolite OE") has the following composition:

$$xM_{2/n}O \cdot Al_2O_3 \cdot (5-10)SiO_2 \cdot yH_2O$$

wherein M stands for a cation having a valency of n, and x and y are numbers larger than 0.

In the as-synthesized state, M includes $K^+$ and $Na^+$. A part of all of $K^+$ or $Na^+$ can be exchanged with other cation according to a known method. The value of x is in the range of from 0.8 to 2 though it varies depending upon the particular degree of washing of the crystal, and the value of y is in the range of from 0 to 10 though it also varies depending upon the particular degree of drying of the crystal.

The X-ray powder diffraction pattern of zeolite OE has significant characteristics. The diffraction angles $2\theta$ (degrees) and lattice spacings (d-values, Å) as measured by using a $K\alpha$ doublet of copper are shown in Table 1.

TABLE 1

| $2\theta$(degrees) | Lattice Spacing (Å) | Intensity |
|---|---|---|
| 7.7 ± 0.2 | 11.5 | Strong |
| 9.6 ± 0.2 | 9.2 | Weak |
| 11.7 ± 0.2 | 7.59 | Fairly strong |
| 13.3 ± 0.2 | 6.65 | Strong |
| 14.0 ± 0.2 | 6.32 | Weak |
| 15.4 ± 0.2 | 5.75 | Weak |
| 16.4 ± 0.2 | 5.40 | Weak |
| 19.4 ± 0.2 | 4.57 | Fairly strong |
| 20.4 ± 0.2 | 4.35 | Strong |
| 21.3 ± 0.2 | 4.17 | Weak |
| 23.2 ± 0.2 | 3.83 | Fairly strong |
| 23.6 ± 0.2 | 3.77 | Strongest |
| 24.8 ± 0.2 | 3.59 | Strong |
| 26.1 ± 0.2 | 3.41 | Weak |
| 26.9 ± 0.2 | 3.31 | Fairly strong |
| 27.6 ± 0.2 | 3.23 | Weak |
| 28.1 ± 0.2 | 3.17 | Fairly strong |
| 28.3 ± 0.2 | 3.15 | Fairly strong |
| 30.5 ± 0.2 | 2.928 | Weak |
| 31.2 ± 0.2 | 2.864 | Strong |
| 31.4 ± 0.2 | 2.847 | Strong |
| 33.4 ± 0.2 | 2.680 | Fairly strong |
| 36.1 ± 0.2 | 2.486 | Fairly strong |
| 38.2 ± 0.2 | 2.354 | Weak |

Zeolite OE is prepared by a process wherein a reaction mixture comprising a silica source, an alumina source, an alkali source, a potassium source and water and having a composition satisfying the following molar ratio conditions:

$$SiO_2/Al_2O_3 = 6-40,$$

$$OH/SiO_2 = 0.3-1,$$

$$K/K+Na = 0.1-0.9, \text{ and}$$

$$H_2O/SiO_2 = 10-70,$$

is crystallized at a temperature of 120° to 200° C. with stirring.

Zeolite OE is also prepared by a process wherein a granular amorphous aluminosilicate containing aluminum in an amount of 4 to 22% by weight as $Al_2O_3$ (on the anhydrous base), which is obtained by reacting an aqueous solution of an alkali metal silicate with an aqueous aluminum-containing solution, is incorporated in an aqueous alkali metal hydroxide solution and/or an aqueous alkali metal silicate solution, to form a mixture having a composition defined by the following molar ratios:

$$SiO_2/Al_2O_3 = 6-40,$$

$$OH/SiO_2 = 0.3-1,$$

$$H_2O/SiO_2 = 10-70, \text{ and}$$

$$K_2O/M_2O = 0.1-0.9,$$

wherein M stands for the total of alkali metals; and the mixture is crystallized with stirring.

BRIEF DESCRIPTION OF THE DRAWINGS

FIG. 2 is an X-ray powder diffraction diagram of the product obtained in Example 5.

DESCRIPTION OF THE PREFERRED EMBODIMENTS

Figure 1:
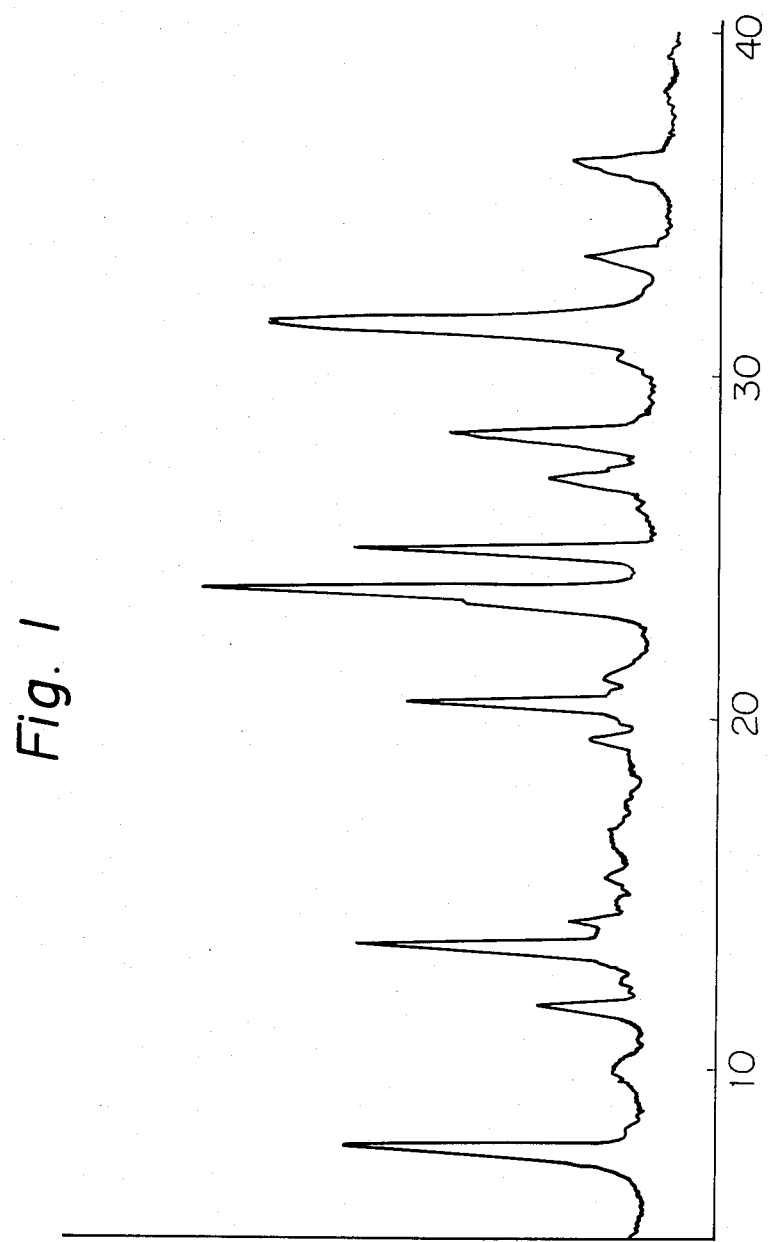
FIG. 1 is an X-ray powder diffraction diagram of zeolite OE obtained in Example 1.

Offretite and TMA-offretite have no peaks at $2\theta = 9.6°$ and 16.4° but erionite has strong peaks at these diffraction angles, while zeolite OE has weak and broad peaks at these diffraction angles. Although zeolite T has no peak at $2\theta = 14.0°$, zeolite OE has a peak at this diffraction angle. In each of offretite, TMA-offretite, elionite, ZSM-34 and zeolite T, a strongest peak appears at $2\theta = 7.7°$, while a strongest peak appears at $2\theta = 23.6°$ in case of zeolite OE.

When zeolite OE was analyzed by the electron diffractometry, it was found that zeolite OE is not mere mixture of known zeolites but it has an offretite structure as the basic structure in which a minute amount of an erionite phase internally grows regularly.

Zeolite OE of the present invention has adsorption properties quite different from those of known zeolite such as zeolite T. Even if erionite and zeolite T are activated by a calcination treatment at 500° to 600° C., they hardly adsorb cyclohexane. If ZSM-34 and TMA-offretite are heat-treated at 100° to 350° C. after the synthesis, they do not adsorb cyclohexane at all, and if they are activated at 500° to 600° C., then cyclohexane can be adsorbed.

On the other hand, even though as-synthesized zeolite OE is only washed with water and dehydrated at a relatively low temperature such as normal temperature to 350° C., zeolite OE becomes capable of adsorbing cyclohexane.

Zeolite OE of the present invention can be prepared by the following two processes.

In a first process, a reaction mixture comprising a silica source, an alumina source, an alkali source, a potassium source and water and having a composition of the following molar ratios:

$$SiO_2/Al_2O_3 = 6-40,$$

$$OH/SiO_2 = 0.3-1,$$

$$K/K+Na = 0.1-0.9, \text{ and}$$

$$H_2O/SiO_2 = 10-70,$$

is crystallized at a temperature of 120° to 200° C. with stirring.

The starting materials for the synthesis of zeolite OE are a silica source, an alumina source, an alkali source, a potassium source and water. Sodium silicate and amorphous silicic acid can be mentioned as the silica source. In order to synthesize zeolite OE at a high purity, it is preferred that synthetic amorphous silicic acid having an apparent specific gravity of not more than 0.3 g/ml, that is, so-called white carbon, be used as the silica source. When colloidal silica, that is, so-called silica sol, is used as the silica source, zeolite OE of the present invention cannot be obtained.

As the alumina source, there are preferably used sodium aluminate, aluminum hydroxide, aluminum sulfate and aluminum nitrate. As the alkali source, sodium hydroxide and potassium hydroxide are preferred. The alkali component present in sodium silicate or sodium aluminate can be an alkali source. The presence of a potassium ion is indispensable in carrying out the present invention. Accordingly, if potassium is not supplied as the alkali, the potassium ion should be supplied independently in the form of a salt such as potassium chloride or potassium sulfate. In the case where aluminum sulfate or aluminum nitrate is used as the alumina source, an alkali should be added for effecting neutralization according to the following reaction formula:

$Al_2(SO_4)_3 + 6NaOH = 3Na_2SO_4 + Al_2O_3 + 3H_2O$ or

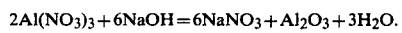

$2Al(NO_3)_3 + 6NaOH = 6NaNO_3 + Al_2O_3 + 3H_2O$.

These silica, alumina, alkali and potassium sources and water are mixed and reacted with sufficient stirring to obtain a reaction mixture having a composition represented by the above-mentioned molar ratios. If the composition of the reaction mixture is outside the range defined by the above molar ratios, zeolite OE cannot be obtained.

A preferred composition is defined by the following molar ratios:

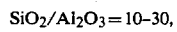

$SiO_2/Al_2O_3 = 10-30$,

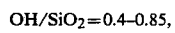

$OH/SiO_2 = 0.4-0.85$,

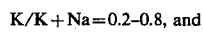

$K/K + Na = 0.2-0.8$, and

$H_2O/SiO_2 = 12-60$.

If the composition of the reaction mixture is within this preferred range, zeolite OE having a high crystallinity can be obtained without concurrent formation of impurities. It is especially preferred that if the $SiO_2/Al_2O_3$ is high (tends to be high) in the above-mentioned preferred range of the composition of the reaction mixture, the $OH/SiO_2$ molar ratio be maintained at a level as high as possible, and that if the $SiO_2/Al_2O_3$ molar ratio is low (tends to be low), the $OH/SiO_2$ molar ratio be maintained at a level as low as possible.

In calculation of the value of OH, sodium aluminate is regarded as $2NaAlO_2 + H_2O = 2NaOH + Al_2O_3$, and sodium silicate is regarded as $Na_2SiO_3 + H_2O = 2NaOH + SiO_2$. Furthermore, aluminum sulfate is regarded as $Al_2(SO_4)_3 + 3H_2O = Al_2O_3 + 3H_2SO_4$, and aluminum nitrate is regarded as $2Al(NO_3)_3 + 3H_2O = Al_2O_3 + 6HNO_3$. Thus, the neutralization equivalent is subtracted from the amount of the added alkali.

Incidentally, OH of $Al(OH)_3$ is excluded from the calculation.

In calculation of the value of $K/(K+Na)$, not only KOH and NaOH but also K and Na supplied in the form of salts are taken into consideration.

In calculation of $H_2O/SiO_2$, not only water supplied in the form of pure water but also water supplied in the form of aqueous solutions, $H_2O$ in the following formulae and water formed by neutralization are taken into consideration:

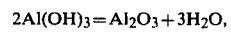

$2Al(OH)_3 = Al_2O_3 + 3H_2O$,

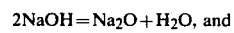

$2NaOH = Na_2O + H_2O$, and

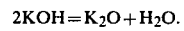

$2KOH = K_2O + H_2O$.

The reaction mixture prepared to have the above-mentioned composition is heated at 120° to 200° C. with stirring to effect crystallization. At the crystallization step, the crystallization time can be shortened by stirring, and furthermore, by stirring, it is made possible to obtain a zeolite having a high crystallinity without concurrent formation of impurities. A preferred crystallization temperature is 130° to 180° C., and the crystallization time is 5 to 40 hours if this preferred temperature is adopted. If the crystallization temperature is lower than 120° C., so crystallization does not occur. If the crystallization temperature is higher than 200° C., an impurity of the zeolite P type is simultaneously formed. After completion of the crystallization, the reaction slurry is subjected to solid-liquid separation according to customary procedures, and the recovered solid is washed with water and dried at 100° to 200° C. to obtain zeolite OE. In a second process, a granular amorphous aluminosilicate containing aluminum in an amount of 4 to 22% by weight as $Al_2O_3$ (on the anhydrous base), which is obtained by reacting an aqueous solution of an alkali metal silicate with an aluminum-containing aqueous solution, is incorporated in an aqueous alkali metal hydroxide solution and/or an aqueous alkali metal silicate solution, to form a mixture having a composition defined by the following molar ratios:

$SiO_2/Al_2O_3 = 6-40$, $OH/SiO_2 = 0.3-1$, $H_2O/SiO_2 = 10-70$, and $K_2O/M_2O = 0.1-0.9$, wherein M stands for the total of alkali metals; and the mixture is crystallized with stirring.

In the second process, a granular amorphous aluminosilicate obtained by reacting an aqueous alkali metal silicate solution with an aqueous aluminum-containing solution is separated from the mother liquor, and the aluminosilicate is added to a fresh aqueous alkali metal hydroxide solution and/or a fresh aqueous alkali metal silicate solution (hereinafter referred to as "aqueous alkali solution") and the resulting suspended aqueous slurry (hereinafter referred to as "suspended mixture") is heated and crystallized with stirring. However, even if the reaction mixture obtained by reacting the aqueous alkali metal silicate solution with the aqueous aluminum-containing solution is directly heated and crystallized, the intended zeolite cannot be obtained at all. Furthermore, even if an aqueous alkali solution is added to the reaction mixture obtained by reacting the aqueous alkali metal silicate solution with the aqeuous aluminum-containing solution and the resulting mixture is heated and crystallized, large quantities of impurities such as zeolite P are simultaneously formed and zeolite OE having a high purity cannot be obtained.

In carrying out the second process, as the aqueous alkali metal silicate solution, there can preferably be used aqueous solutions of sodium silicate, potassium silicate and lithium silicate and silicic acid-dissolved aqueous alkali solutions. As the aqueous aluminum-containing solution, there are preferably used aqueous solutions of sodium aluminate, potassium aluminate, aluminum chloride and aluminum nitrate, and alkali-dissolved or mineral acid-dissolved aqueous solutions of aluminum hydroxide and aluminum oxide.

Preferred embodiments of reacting the aqueous solution of the alkali metal silicate with the aluminum-containing aqueous solution are as follows:

(A) A method in which the aqueous alkali metal silicate solution is charged in a vessel, and the aqueous aluminum-containing solution is gradually added thereto with stirring.

(B) A method in which the aqueous aluminum-containing solution is charged in a vessel, and the aqueous alkali metal silicate solution is gradually added with stirring.

(C) A method in which water is charged in a vessel, and the aqueous alkali metal silicate solution and the aqueous aluminum-containing solution are simultaneously added with stirring.

(D) A method in which the aqueous alkali metal silicate solution and the aqueous aluminum-containing solution are continuously supplied at a substantially constant ratio to a reaction vessel provided with a stirrer and a device for withdrawing a slurry continuously or intermittently, such as an overflow tube.

Of course, two or more of the foregoing methods (A) through (D) may be adopted in combination.

Embodiments of the reaction of the second process are not limited to the above-mentioned embodiments, and various modifications may be adopted. The methods (C) and (D) are especially preferred. Zeolite OE having none of impurities can be prepared at a high efficiency according to the method (C) or (D).

The reason is considered to be that the granular amorphous aluminosilicate obtained by reacting both the aqueous solutions while continuously supplying them at a substantially constant ratio to the reaction system is precipitated always with the same composition and is homogeneous even microscopically and regular arrangement necessary for the crystallization is easily attained.

In the method (D), if the apparent residence time [namely, actual capacity (l) of reaction vessel/amount (l/min) of reaction slurry discharged from reaction vessel per unit time] of the reaction slurry in the reaction vessel is adjusted to at least 3 minutes, a substantially spherical amorphous aluminosilicate having a particle size of 10 to 100 microns can be obtained, and post treatments such as solid-liquid separation, crystallization and water washing can be remarkably facilitated.

In the second process, the adjustment of the pH value at the reaction between both the aqueous solutions is very important for obtaining zeolite OE having much reduced quantities of impurities. In the methods (A), (B) and (C), it is preferred that the pH value of the reaction slurry after mixing of both the aqueous solutions be adjusted to 5 to 9. In the method (D), it is preferred that the pH value of the reaction slurry discharged be in the range of from 5 to 9. In each method, it is especially preferred that the pH value of the slurry be 6 to 8.

The pH value adjustment can be accomplished by adding a mineral acid or alkali for the pH value adjustment to one or both of the aqueous solutions or to the reaction zone independently from both the aqueous solutions.

In each of the foregoing methods, a granular amorphous aluminosilicate having a low $Al_2O_3$ content can be obtained by increasing the $SiO_2$ concentration of the aqeuous alkali metal silicate solution or increasing the mixing ratio (flow rate) of said aqueous solution, though the $Al_2O_3$ content is varied according to the $SiO_2$ and $Al_2O_3$ concentrations of both the aqueous solutions or the mixing ratio [flow rate ratio in the method (D)] of both the aqueous solutions. In carrying out the second process of the present invention, it is indispensable that the aluminum content of the granular amorphous aluminosilicate should be 4 to 22% by weight as $Al_2O_3$ (on the anhydrous base). If this requirement is not satisfied, however controlled other conditions may be, intended zeolite OE having a high purity cannot be obtained at all, and even when zeolite OE is produced, impurities such as zeolite P are concurrently formed and in some case, even crystallization is impossible.

If the reaction slurry is subjected to crystallization without solid-liquid separation, large quantities of impurities such as zeolite P are concurrently formed and intended zeolite OE cannot be obtained at a high purity.

As the aqueous alkali solution, in which the granular amorphous aluminosilicate is crystallized, there are preferably used aqueous solutions of sodium hydroxide, potassium hydroxide, lithium hydroxide, sodium silicate, potassium silicate and lithium silicate. Two or more of the foregoing aqueous solutions may be used in combination. Aqueous solutions of sodium hydroxide, sodium silicate, potassium hydroxide, potassium silicate and their mixture are preferable. Another liquor obtained by solid-liquid separation after completion of the crystallization can also be economically advantageously used.

The suspended mixture, obtained by incorporating the granular amorphous aluminosilicate in the aqueous alkali solution, should have the composition satisfying the above-mentioned molar ratio requirements. It is preferred that the composition of the suspended mixture be defined by the following molar ratios:

$SiO_2/Al_2O_3 = 10$–$30$, $OH/SiO_2 = 0.4$–$0.85$, $H_2O/SiO_2 = 12$–$60$, and $K_2O/M_2O = 0.2$–$0.8$.

If the composition of the suspended mixture is within this preferred range, zeolite OE having a high crystallinity can be obtained without concurrent formation of impurities. It is especially preferred that if the $SiO_2/Al_2O_3$ is high (tends to be high) in the above-mentioned preferred range of the composition of the suspended mixture, the $OH/SiO_2$ molar ratio be maintained at a level as high as possible, and that if the $SiO_2/Al_2O_3$ molar ratio is low (tends to be low), the $OH/SiO_2$ molar ratio be maintained at a level as low as possible.

In calculation of OH, the alkali taken through the granular amorphous alumino-silicate is regarded as follows:

$$M_2O + H_2O = 2MOH$$

and the alkali metal silicate as the aqueous alkali solution is regraded as follows:

$$M_2SiO_3 + H_2O = 2MOH + SiO_2.$$

The crystallization of zeolite OE and post-crystallization treatment thereof can be effected in the same manner as mentioned in the first process.

Zeolite OE of the present invention has a sufficient activity after drying at 100° to 200° C., and adsorbs benzene, n-hexane, i-pentane and cyclohexane. Accordingly, zeolite OE of the present invention can be used as an adsorbent for these solvents. Furthermore, since zeolite OE of the present invention has a very high dehydrating activity, it can be used effectively as a drying agent for a gas or liquid. Even if zeolite OE is used after it has been heat-treated at 500° to 600° C., no disadvantages are brought about. When zeolite OE is ion-exchanged with $H^+$ or other cations, it acts as a strong solid acid, and therefore, it can be used as a catalyst for various reactions. Zeolite OE of the present invention may be applied to various uses not only in the powdery form but after it has been molded into a spherical or cylindrical shape.

The present invention will now be described with reference to the following examples.

In the examples, the apparent specific gravity, the adsorption of cyclohexane and the X-ray powder diffractometry were determined as follows.

Measurement of Apparent Specific Gravity 1 g of a sample was placed in a cylinder of an apparent specific gravity measuring device. A piston was inserted into the cylinder and let to fall down into the cylinder while lightly tapping the piston with a finger. After 30 minutes' standing, the difference (H cm) of the height between the piston and cylinder was measured and the apparent specific gravity was calculated according to the following formula:

$$\text{Apparent specific gravity} = \frac{1}{(H - 1.2^*) \times 3.8^{**}}$$

Note:
The apparent specific gravity measuring device comprises a metal cylinder and a piston to be adapted to the cylinder. The cylinder has an inner diameter of 2.2 cm and a depth of 11.5 cm, and the piston has a length of 12.7 cm and a weight of 190 g. The apparent specific gravity measured by this device is expressed by the weight of 1 ml of the sample as the number of g when compressed under a pressure of 50 g/cm.
*1.2 = 12.7 − 11.5
**3.8 = area of cylinder = 1.1 × 1.1 × 3.14

Measurement of Adsorption of Cyclohexane

The measurement was carried out by using a McBain-Bakr type adsorption apparatus. About 1 g of a sample was activated in vacuo at 350° C. for 2 hours, and a cyclohexane vapor was introduced under a pressure of 48 mmHg while maintaining the sample temperature at 25° C. After the lapse of 3 hours, the amount of cyclohexane adsorbed was measured.

X-Ray Powder Diffractometry

The sample was dried and was then hydrated under a relative humidity of 80%, and the measurement was carried out at a tube voltage of 35 KV and a tube current of 25 mA with a Ni filter by using a $K\alpha$ doublet of copper as the beam source.

EXAMPLE 1

To 701.2 g of deionized water were added 23.6 g of solid sodium hydroxide (NaOH: 93% by weight), 26.8 g of solid potassium hydroxide (KOH: 85% by weight) and 51.4 g of an aqueous solution of sodium aluminate ($Na_2O$: 19.2% by weight, $Al_2O_3$: 20.66% by weight) to form a homogeneous solution. 142.9 g of white carbon ($SiO_2$: 87.7% by weight, $Al_2O_3$: 0.5% by weight, apparent specific gravity: 0.14 g/ml) was added to the solution with sufficient stirring to obtain a reaction mixture having a composition defined by the following formula:

$$3.9Na_2O \cdot 1.83K_2O \cdot Al_2O_3 \cdot 18.8SiO_2 \cdot 382H_2O.$$

This reaction mixture satisfies the following oxide molar ratios:

$SiO_2/Al_2O_3 = 18.8$, $OH/SiO_2 = 0.61$, $K/K + Na = 0.32$, and $H_2O/SiO_2 = 20.3$.

The reaction mixture was charged in an autoclave and heated at 150° C. for 40 hours with stirring at 250 rpm. The obtained slurry was subjected to solid-liquid separation, and the recovered solid was washed with water and then dried at 150° C. for 5 hours to obtain a powder having the following composition:

$$0.22Na_2O \cdot 0.96K_2O \cdot Al_2O_3 \cdot 8.5SiO_2 \cdot 5.8H_2O$$

The X-ray powder diffractometry of the obtained powder is shown in FIG. 1, by which it was confirmed that the product was zeolite OE. The adsorption capacity of cyclohexane was 1.9% by weight (as measured at 25° C. under 48 mmHg).

EXAMPLES 2 THROUGH 4 AND COMPARATIVE EXAMPLES 1 AND 2

The preparation of zeolite was carried out in the same manner as described in Example 1 except that the silica source and composition of the reaction mixture and the crystallization conditions were varied as shown in Table 2. The obtained results are shown in Table 2.

Incidentally, the silica source used in Comparative Example 2 was silica sol having an $SiO_2$ content of 30% by weight.

TABLE 2

| | | Composition of Reaction Mixture | | | | Crystallization Conditions | | | |
| | Silica Source | $SiO_2/Al_2O_3$ | $OH/SiO_2$ | $K/K + Na$ | $H_2O/SiO_2$ | Temperature (°C.) | Time (hours) | Stirring Rate (ppm) | Result (Remarks) |
|---|---|---|---|---|---|---|---|---|---|
| Example 1 | White carbon | 18.8 | 0.61 | 0.32 | 20.3 | 150 | 40 | 250 | Zeolite OE |
| Example 2 | White carbon | 30 | 0.76 | 0.32 | 20.3 | 150 | 40 | 250 | Zeolite OE |

TABLE 2-continued

| | Composition of Reaction Mixture | | | | Crystallization Conditions | | | |
|---|---|---|---|---|---|---|---|---|
| | Silica Source | $SiO_2/Al_2O_3$ | $OH/SiO_2$ | $K/K + Na$ | $H_2O/SiO_2$ | Temperature (°C.) | Time (hours) | Stirring Rate (ppm) | Result (Remarks) |
| Example 3 | White carbon | 14 | 0.50 | 0.31 | 25 | 150 | 24 | 250 | Zeolite OE |
| Example 4 | White carbon | 18.8 | 0.61 | 0.32 | 20.3 | 190 | 10 | 250 | Zeolite OE |
| Comparative Example 1 | White carbon | 18.8 | 0.61 | 0.32 | 20.3 | 150 | 40 | 0 | Adularia |
| Comparative Example 2 | Silica sol | 28 | 0.77 | 0.26 | 16.1 | 100 | 166 | 0 | Zeolite T (Example 2 of USP 2950952) |

EXAMPLE 5

A sulfuric acid-added aqueous aluminum sulfate solution ($Al_2O_3$: 44.4 g/l, $H_2SO_4$: 262.3 g/l) and an aqueous sodium silicate solution ($Na_2O$: 65.6 g/l, $SiO_2$: 200 g/l, $Al_2O_3$: 2.2 g/l) were continuously fed at rates of 1 l/hr and 3 l/hr, respectively, to a stirrer-provided, overflow type reaction vessel (having an actual capacity of 2 liters). The apparent residence time of the reaction slurry was 30 minutes, the temperature was 30° to 32° C., and the pH value was 6.3. The discharged reaction slurry was subjected to solid-liquid separation by a centrifugal filter, and the recovered solid was sufficiently washed with water to obtain a wet cake of a granular amorphous aluminosilicate having an $Al_2O_3$ content of 6.76% by weight (on the anhydrous base), an $Na_2O$ content of 4.9% by weight (on the anhydrous base), an $SiO_2$ content of 83.3% by weight (on the anhydrous base) and an $H_2O$ content of 61.6% by weight (on the wet base).

Then, 2.38 kg of the wet cake was added to 3.27 kg of deionized water containing, dissolved therein, 176 g of solid NaOH (NaOH: 98% by weight) and 175 g of solid KOH (KOH: 85% by weight) to form a suspended mixture having a composition defined by the following molar ratios:

$SiO_2/Al_2O_3 = 20.9$, $OH/SiO_2 = 0.66$, $H_2O/SiO_2 = 21$, and $K/K + Na = 0.32$.

The slurry mixture was charged in an autoclave having a capacity of 10 liters, and the slurry mixture as heated at 150° C. with stirring at 120 rpm for 20 hours to effect crystallization. After the reaction, the slurry having a product suspended therein was subjected to solid-liquid separation, and the recovered solid was sufficiently washed with water and then dried at 120° C. The product was zeolite OE having a composition defined by the following formula:

$0.19Na_2O \cdot 0.86K_2O \cdot Al_2O_3 \cdot 7.4SiO_2 \cdot yH_2O$

The X-ray powder diffraction diagram of the product is shown in FIG. 2. Incidentally, the presence of impurities was hardly observed. The adsorption capacity of cyclohexane was 1.2% by weight (as measured at 25° C. under 48 mmHg).

EXAMPLE 6

A vessel having a capacity of 10 liters was charged with 1.6 l of a sulfuric acid-added aqueous aluminum sulfate solution ($Al_2O_3$: 48.5 g/l, $H_2SO_4$: 207 g/l). Then, 4 l of an aqueous sodium silicate solution ($Na_2O$: 65.6 g/l, $SiO_2$: 200 g/l, $Al_2O_3$: 2.2 g/l) was added with stirring over a period of 20 minutes. The pH value after completion of the addition was 6.2, and stirring was further continued for 1 hour after completion of the addition and the reaction mixture was subjected to solid-liquid separation. The recovered solid was sufficiently washed with water. Then, 470 g of the thus-obtained wet cake ($Al_2O_3$: 8.6% by weight on the anhydrous base) was added to 480 g of deionized water containing, dissolved therein, 17.8 g of solid NaOH (NaOH: 98% by weight) and 36.9 g of solid KOH (KOH: 85% by weight) to form a suspended mixture having the following composition:

$SiO_2/Al_2O_3 = 16$, $OH/SiO_2 = 0.6$, $H_2O/SiO_2 = 20$, and $K/K + Na = 0.42$.

The suspended mixture was charged in an autoclave having a capacity of 2 liters and was heated at 150° C. with stirring at 250 rpm for 20 hours to effect crystallization. After the reaction, the slurry having a product suspended therein was taken out and subjected to solid-liquid separarion, and the recovered solid was sufficiently washed with water and then dried at 120° C. The product was zeolite OE and a very slight amount of zeolite P was observed as an impurity.

COMPARATIVE EXAMPLE 3

The procedures of Example 5 were repeated in the same manner except that an autoclave having a capacity of 2 liters was used and stirring was not performed. The product was composed mainly of adularia and zeolite OE was not obtained.

We claim:

1. A process for the preparation of zeolites having lattice spacings of the X-ray powder diffraction diagram substantially shown in Table 1 which zeolite is capable of adsorbing at least 1% by weight (as measured at 25° C. under 48 mmHg) of cyclohexane without a calcination treatment at a temperature higher than 350° C. and without using tetramethylammonium ions or chloine, which process comprises:

reacting an aqueous alkali metal silicate solution with an aqueous aluminum-containing solution while both solutions are simultaneously and continuously supplied into a reaction vessel, to obtain a granular amorphous aluminosilicate containing aluminum in an amount of 4 to 22% by weight as $Al_2O_3$ (on the anhydrous base) and having a particle size of 10 to 100 microns, separating the granular amorphous aluminosilicate from a mother liquor, adding the granular amorphous aluminosilicate into a solution of at least one compound selected from the group consisting of an alkali metal hydroxide and an alkali metal silicate to form a reaction mixture having a composition defined by the following molar ratios:

$SiO_2/Al_2O_3 = 10-30$, $OH/SiO_2 = 0.4-0.85$, $H_2O/SiO_2 = 12-60$, and $K/M = 0.2-0.8$ where M stands for the total of the alkali metals, and then crystallizing the mixture with stirring at a temperature of 130° to 180° C. for a period of 5 to 40 hours.

2. A process according to claim 1, wherein the aqueous alkali metal silicate solution is selected from the group consisting of aqueous solutions of sodium silicate, potassium silicate and lithium silicate and silicic acid-dissolved aqueous alkali solutions.

3. A process according to claim 1, wherein the aqueous aluminum-containing solution is selected from the group consisting of aqueous solutions of sodium aluminate, potassium aluminate, aluminum chloride and aluminum nitrate, and alkali-dissolved or mineral acid-dissolved aqueous solutions of aluminum hydroxide and aluminum oxide.

4. A process according to claim 1, wherein the alkali metal hydroxide is selected from the group consisting of sodium hydroxide, potassium hydroxide and lithium hydroxide, and the alkali metal silicate is selected from the group consisting of sodium silicate, potassium silicate and lithium silicate.

5. A process according to claim 1, wherein the reaction of the aqueous alkali metal silicate solution with the aqueous aluminum-containing solution is effected by a method in which water is charged in the reaction vessel and then the aqueous alkali metal silicate solution and the aqueous aluminum-containing solution are supplied thereinto with stirring while the pH value of a reaction slurry after the addition of both the aqueous solution is maintained in the range of from 5 to 9.

6. A process according to claim 1, wherein the reaction of the aqueous alkali metal silicate solution with the aqueous aluminum containing solution is affected by a method in which the aqueous alkali metal silicate solution and the aqueous aluminum-containing solution are supplied at a substantially constant ratio to the reaction vessel with stirring while a reaction slurry having a pH value of from 5 to 9 is continuously or intermittently withdrawn from the reaction vessel.

* * * * *